US011509784B2

United States Patent
Tanaka et al.

(10) Patent No.: US 11,509,784 B2
(45) Date of Patent: Nov. 22, 2022

(54) INFORMATION PROCESSING APPARATUS, IMAGE FORMING APPARATUS, AND NON-TRANSITORY COMPUTER READABLE MEDIUM

(71) Applicant: FUJIFILM BUSINESS INNOVATION CORP., Tokyo (JP)

(72) Inventors: Shogo Tanaka, Kanagawa (JP); Kenji Sawai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/140,562

(22) Filed: Jan. 4, 2021

(65) Prior Publication Data
US 2022/0030126 A1 Jan. 27, 2022

(30) Foreign Application Priority Data
Jul. 22, 2020 (JP) .............................. JP2020-125719

(51) Int. Cl.
*H04N 1/00* (2006.01)
(52) U.S. Cl.
CPC ....... *H04N 1/00639* (2013.01); *H04N 1/0066* (2013.01); *H04N 1/00689* (2013.01); *H04N 1/00748* (2013.01)

(58) Field of Classification Search
CPC .................................................. H04N 1/00639
USPC ........................................................ 358/1.12
See application file for complete search history.

(56) References Cited

U.S. PATENT DOCUMENTS

| 2009/0121407 | A1* | 5/2009 | Kawamura | ........ G03G 15/6538 270/32 |
| 2014/0293304 | A1* | 10/2014 | Seto | ........ G06T 11/60 358/1.12 |
| 2018/0159989 | A1* | 6/2018 | Mizuno | ............. H04N 1/00005 |
| 2021/0281711 | A1* | 9/2021 | Yana | ................. H04N 1/00037 |

FOREIGN PATENT DOCUMENTS

JP 2016-113284 A 6/2016

* cited by examiner

*Primary Examiner* — Jacky X Zheng
(74) *Attorney, Agent, or Firm* — Oliff PLC

(57) ABSTRACT

An information processing apparatus includes: a processor is configured to: read an image of at least one of a first surface or a second surface of a medium with the medium folded; discriminate whether the image is of the first surface or the second surface based on an identification image in the image; specify, based on the image, a surface on which a folding deviation occurs; and determine a correction direction of the folding deviation according to whether the surface on which the folding deviation occurs is the first surface or the second surface.

17 Claims, 13 Drawing Sheets

SCAN ADJUSTMENT SHEET

PLACE ADJUSTMENT SHEET ON PLATEN GLASS WITHOUT UNFOLDING
   ADJUSTMENT SHEET.

START

FIG. 7

| FOLDING MANNER | DIVISION NUMBER | SURFACE | INSIDE LINE | CLOSER SIDE | FARTHER SIDE |
|---|---|---|---|---|---|
| HALF-FOLD | 2 | FIRST SURFACE | SHEET EDGE 1 | SHEET EDGE 2 | FOLDING LINE |
| | 2 | SECOND SURFACE | NONE | NONE | NONE |
| TRI-FOLD | 3 | FIRST SURFACE | SHEET EDGE 1 | FOLDING LINE 2 | FOLDING LINE 1 |
| | 3 | SECOND SURFACE | NONE | NONE | NONE |
| 6-PAGE ACCORDION FOLD | 3 | FIRST SURFACE | SHEET EDGE 1 | FOLDING LINE 2 | FOLDING LINE 1 |
| | 3 | SECOND SURFACE | SHEET EDGE 2 | FOLDING LINE 1 | FOLDING LINE 2 |

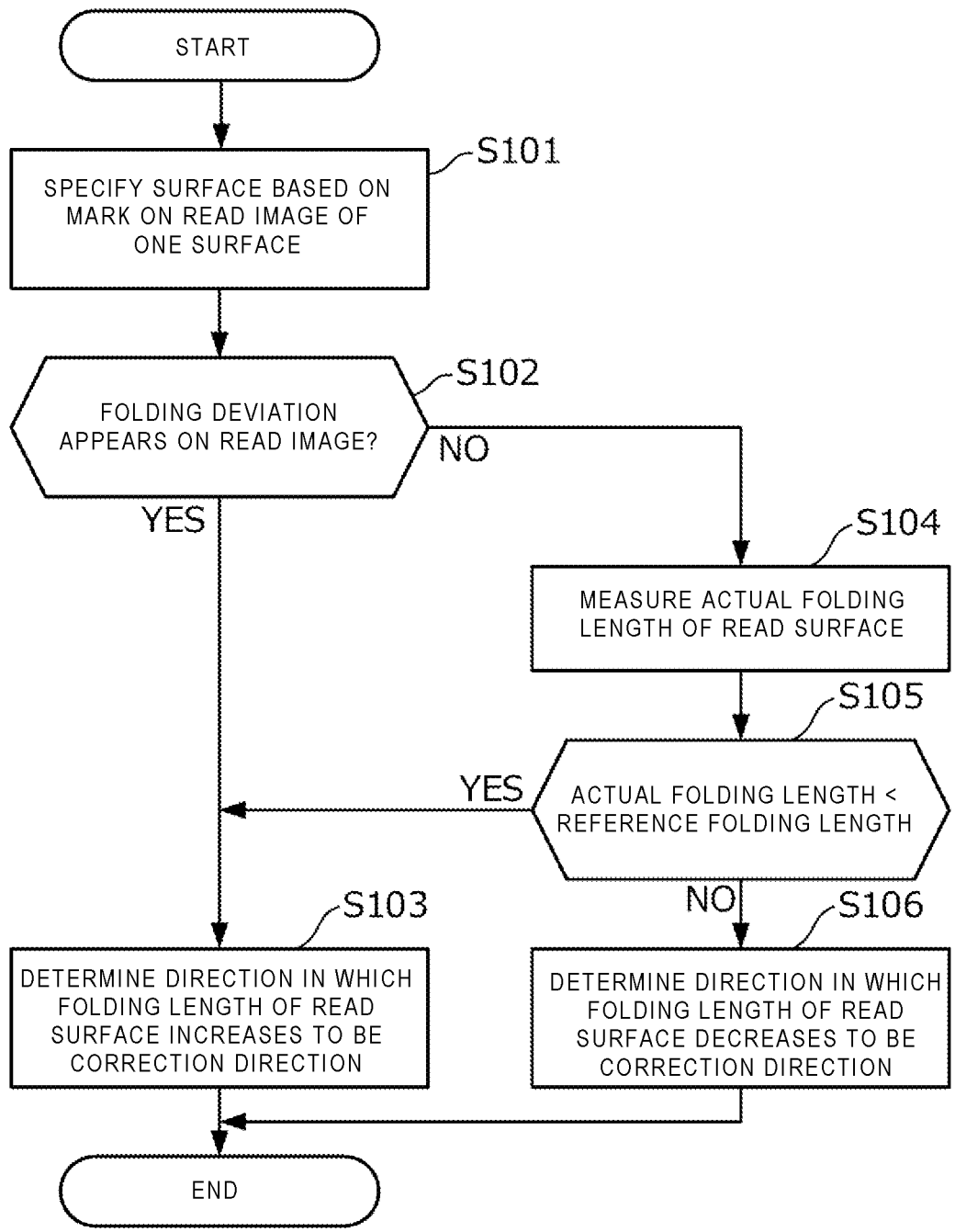

| FOLDING METHOD | MARK | SURFACE |
|---|---|---|
| HALF-FOLD | ■ | FIRST SURFACE |
| | ●／NONE | SECOND SURFACE |
| TRI-FOLD | ■ | FIRST SURFACE |
| | ●／NONE | SECOND SURFACE |
| 6-PAGE ACCORDION FOLD | ■ | FIRST SURFACE |
| | ● | SECOND SURFACE |

INFORMATION PROCESSING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-125719 filed Jul. 22, 2020.

BACKGROUND

(i) Technical Field

The present disclosure relates to an information processing apparatus, an image forming apparatus, and a non-transitory computer readable medium.

(ii) Related Art

Attempts have been made to automatically detect a folding deviation amount at a folding position where a medium is folded by a folding device in order to adjust the folding position. Such automatic detection methods include a method of detecting a folding length of a folded medium, and a method of detecting a deviation amount at a sheet edge of the folded medium.

For example, JP-A-2016-113284 discloses a recording medium folding system in which when a manually fed recording medium is folded, the recording medium may be folded in a predetermined folding manner regardless of a front or back side of the recording medium.

SUMMARY

However, when a method of detecting the deviation amount of the folding position of the medium still folded is not able to determine which surface of the medium is being read, a direction in which a folding deviation occurs cannot be discriminated, and a correction direction cannot be specified.

Aspects of non-limiting embodiments of the present disclosure relate to an information processing apparatus, an image forming apparatus, and a non-transitory computer readable medium that are capable of specifying a correction direction of a folding deviation amount when a correction amount of a folding position of a medium folded by a folding device is to be output.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor is configured to: read an image of at least one of a first surface or a second surface of a medium with the medium folded; discriminate whether the image is of the first surface or the second surface based on an identification image in the image; specify, based on the image, a surface on which a folding deviation occurs; and determine a correction direction of the folding deviation according to whether the surface on which the folding deviation occurs is the first surface or the second surface.

BRIEF DESCRIPTION OF THE DRAWINGS

Exemplary embodiment(s) of the present disclosure will be described in detail based on the following figures, wherein:

FIG. 5 is a diagram showing an example of a guide screen that prompts a user to place an adjustment sheet on a platen glass;

FIG. 7 is a table showing a relationship among lines obtained by image analysis, a sheet edge(s), and a folding line(s);

FIG. 10 is a flowchart of an example of a process of determining a correction direction when an image of only one of first and second surfaces of the sheet is read;

DETAILED DESCRIPTION

1. Configuration

Figure 1:
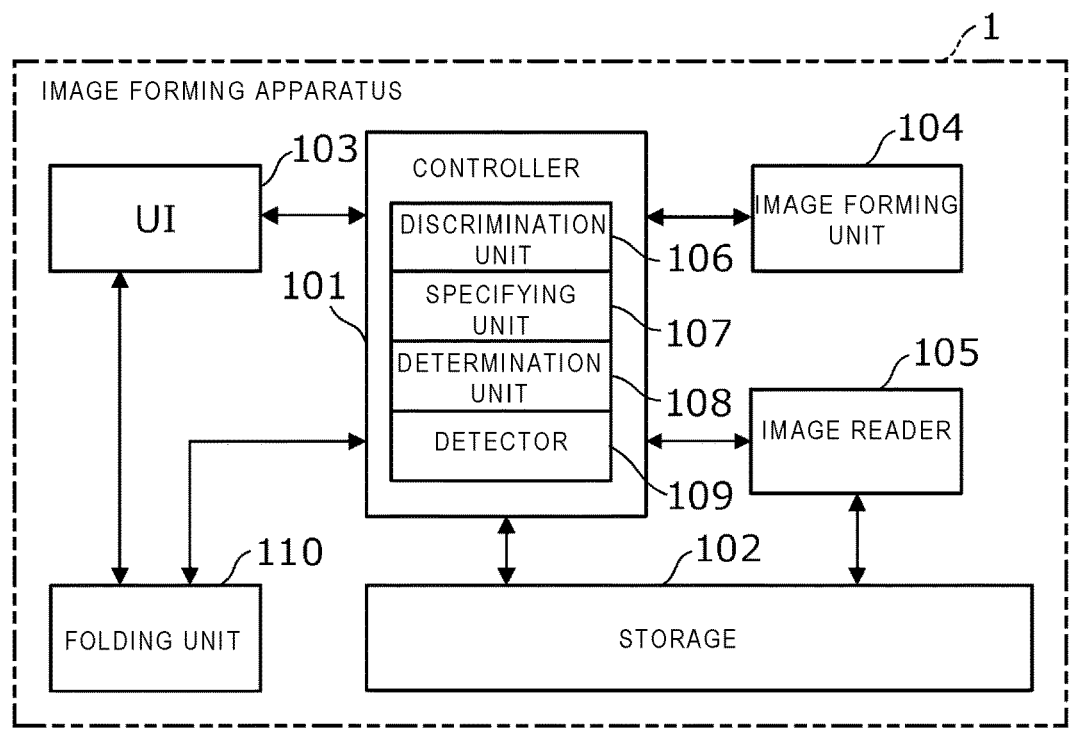
FIG. 1 is a block diagram showing a functional configuration of an image forming apparatus.

FIG. 1 is a block diagram showing a functional configuration of an image forming apparatus 1 according to an exemplary embodiment. The image forming apparatus 1 of the present exemplary embodiment performs (i) a process of receiving, from a user interface (hereinafter referred to as a "UI"), an instruction to fold a sheet, (ii) a process of forming an image on the sheet, (iii) a process of folding the sheet, (iv) a process of reading (that is, scanning) the image formed on the sheet, (v) a process of detecting a folding position of the sheet, and (vi) a process of adjusting the folding position of the sheet. Here, the "folding position" refers to a position where the image forming apparatus 1 folds the sheet. The "sheet" is an example of a medium.

The image forming apparatus 1 includes a controller 101, a storage 102, a UI 103, an image forming unit 104, an image reader 105, a discrimination unit 106, a specifying unit 107, a determination unit 108, a detector 109, and a folding unit 110. The controller 101 executes various processes according to a program stored in the storage 102. The controller 101 is connected to the UI 103, the image forming unit 104, the image reader 105, and the folding unit 110, and controls these units. The "folding unit" is an example of a folding device. The controller 101 is an example of an information processing apparatus. The controller 101 includes a processor such as a central processing unit (CPU). The storage 102 stores the program to be executed by the controller 101, information related to a folding manner, and information obtained in the folding position adjustment process. The storage 102 includes a recording device such as a read only memory (ROM), a random access memory (RAM), or a flash memory. The UI 103 provides the user interface. Specifically, the UI 103 displays a screen related to a function of the image forming apparatus 1, such as a screen related to the folding position adjustment process, and a screen for receiving an operation input by a user. The UI 103 includes a display device such as a liquid crystal display, and an input device such as a touch screen.

The controller 101 includes the discrimination unit 106, the specifying unit 107, the determination unit 108, and the detector 109. The discrimination unit 106 discriminates which surface (that is, a first surface or a second surface, which will be described later) the read image is. The specifying unit 107 specifies a surface on which a folding deviation occurs. The determination unit 108 determines a correction direction of a folding deviation amount in a folding position adjustment process. Here, the "correction direction" refers to a direction in which the folding deviation amount is reduced, that is, a direction in which an actual folding position is moved. The "folding deviation amount" refers to a distance (length) between an actual folding position and a reference folding position. The "reference folding position" refers to a desired folding position of a sheet. The phrase "folding deviation occurs" refers to that a difference between the actual folding position and the reference folding position is equal to or greater than a threshold value. A "surface on which the folding deviation occurs" refers to a surface on which the folding deviation can be explicitly observed in the read image. The reference folding position is defined for each folding manner. For example, the reference folding position is a position at which the sheet is equally divided into plural areas. The "actual folding position" refers to a position of a fold actually formed on the sheet in the folding process performed by the folding unit 110. The detector 109 detects the folding deviation amount. Furthermore, the detector 109 calculates an adjustment value for adjusting the folding position. The image forming unit 104 forms an image on the sheet. The image reader 105 reads a surface condition of the sheet as an image. It is noted that the "surface condition" includes the image formed on the sheet. The folding unit 110 folds the sheet based on the instruction input by the user. For example, the folding unit 110 has a function of creating a booklet by stacking plural sheets, saddle stitching the sheets, and then folding the sheets in half.

Figure 2:
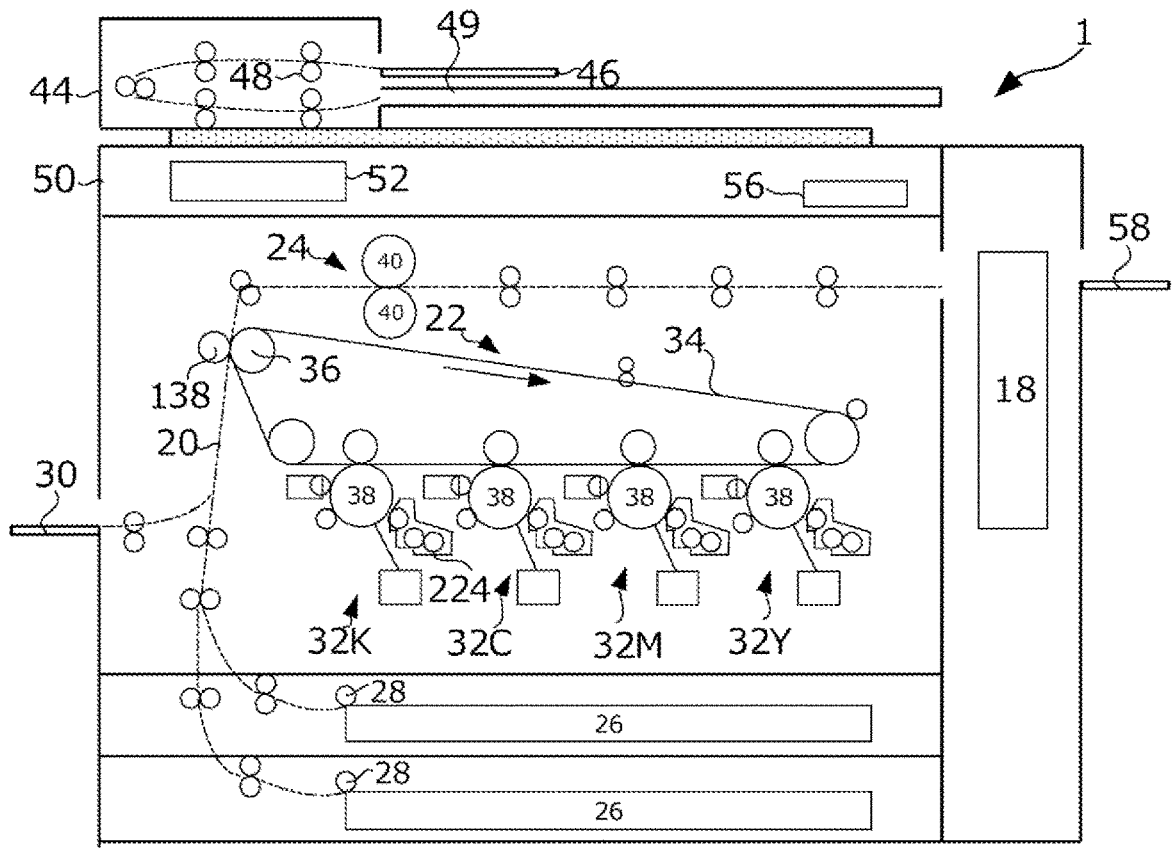
FIG. 2 is a schematic diagram of the image forming apparatus according to an exemplary embodiment.

FIG. 2 is a schematic diagram showing the image forming apparatus 1 according to the exemplary embodiment. The image forming apparatus 1 includes a transport path 20, trays 26, feed rollers 28, a manual feed tray 30, and an automatic transport unit 44. The transport path 20 is a path that transports a sheet from the tray 26 to the folding unit 110. For example, plural rollers and motors that drive the rollers are provided on the transport path 20. One end of the transport path 20 is connected to each tray 26. The other end thereof is connected to the folding unit 110. The sheet is transported from a predetermined location (for example, the tray 26 or the manual feed tray 30) on the transport path 20 to another location (for example, the image forming unit 104 or the folding unit 110) on the transport path 20.

The tray 26 accommodates sheets. Although the two trays 26 are shown in FIG. 2, more trays 26 may be provided. The trays 26 accommodate, for example, different types of sheets. The feed roller 28 feeds the sheet accommodated in the tray 26 to the transport path 20. The sheets may be stacked on the manual feed tray 30.

In this example, the image forming apparatus 1 is an electrophotographic image forming apparatus. The image forming unit 104 includes a toner image forming unit 22 and a fixing unit 24. The toner image forming unit 22 forms a toner image on the sheet. Specifically, the toner image forming unit 22 acquires image signals of respective colors of yellow (Y), magenta (M), cyan (C), and black (K) that are generated based on image data of the respective colors of Y, M, C, and K. The toner image forming unit 22 includes developing units 32Y, 32M, 32C, 32K, a transfer belt 34, a transfer roller 36, and a roller 138. The toner image forming unit 22 forms toner images of the respective colors of Y, M, C, and K on photoconductor drums 38Y, 38M, 38C, and 38K with the developing units 32Y, 32M, 32C, and 32K based on the acquired image signals, and superimposes the formed toner images on the transfer belt 34. The transfer belt 34 is wound around plural rollers including the transfer rollers 36 near the transport path 20. The transfer belt 34 is rotationally driven as an intermediate image carrier. The transfer belt 34 transfers the superimposed toner images onto the sheet. The transfer belt 34 is in contact with the photoconductor drums 38Y, 38M, 38C, and 38K provided in the developing units 32Y, 32M, 32C, and 32K. The transfer roller 36 and the roller 138 sandwich the sheet and the transfer belt 34, and transfer the toner image of the transfer belt 34 onto the sheet. The transfer roller 36 faces the roller 138. The sheet is transported between the transfer roller 36 and the roller 138 on the transport path 20. The fixing unit 24 fixes the toner image formed on the sheet to form an image on the sheet. The fixing unit 24 includes a pair of fixing rollers 40. The fixing unit 24 heats the sheet while applying pressure thereon in a state where the sheet transported between the fixing rollers 40 is sandwiched by the fixing rollers 40.

The image reader 105 includes the automatic transport unit 44, an exposure optical system 50, and a solid-state imaging element CCD 56. The image reader 105 is located below a platen glass PG. The automatic transport unit 44 transports a sheet stacked on a sheet feeding tray 46 to the image reader 105. The automatic transport unit 44 includes the sheet feeding tray 46, platen rollers 48, and a sheet discharge tray 49. The sheets whose images are to be read are stacked in the sheet feeding tray 46. The stacked sheet is fed from the sheet feeding tray 46 to the platen rollers 48. The platen rollers 48 transport the fed sheet onto the platen glass PG. The sheet is discharged to the sheet discharge tray 49 after the image reading is completed. Although illustration and description of a detailed configuration of the image reader 106 are omitted, the image reader 105 can read both sides of the sheet.

The exposure optical system 50 reads the image of the sheet. Specifically, the exposure optical system 50 emits light from a light source 52 to the sheet fed onto the platen glass PG or a sheet that the user places on the platen glass PG, and receives reflected light from the sheet. The solid-state imaging element CCD 56 converts the received reflected light into an electric signal. The exposure optical system 50 includes the light source 52 and plural mirrors.

When an image of the sheet that is placed on the platen glass PG by the user is read, the exposure optical system 50 moves to scan the sheet.

The folding unit 110 includes a folding mechanism 18 and a discharge tray 58. The folding mechanism 18 folds the sheet based on the instruction input by the user. The folded sheet is discharged to the discharge tray 58.

In the folding position adjustment process, even if the folding deviation amount is detected, the sheet may be read with the sheet still folded and it may not be known which surface of the sheet is being read. In this case, a direction in which a folding deviation occurs cannot be determined, and a correction direction cannot be determined. Therefore, the image forming apparatus 1 addresses this issue.

2. Operation

Figure 3:
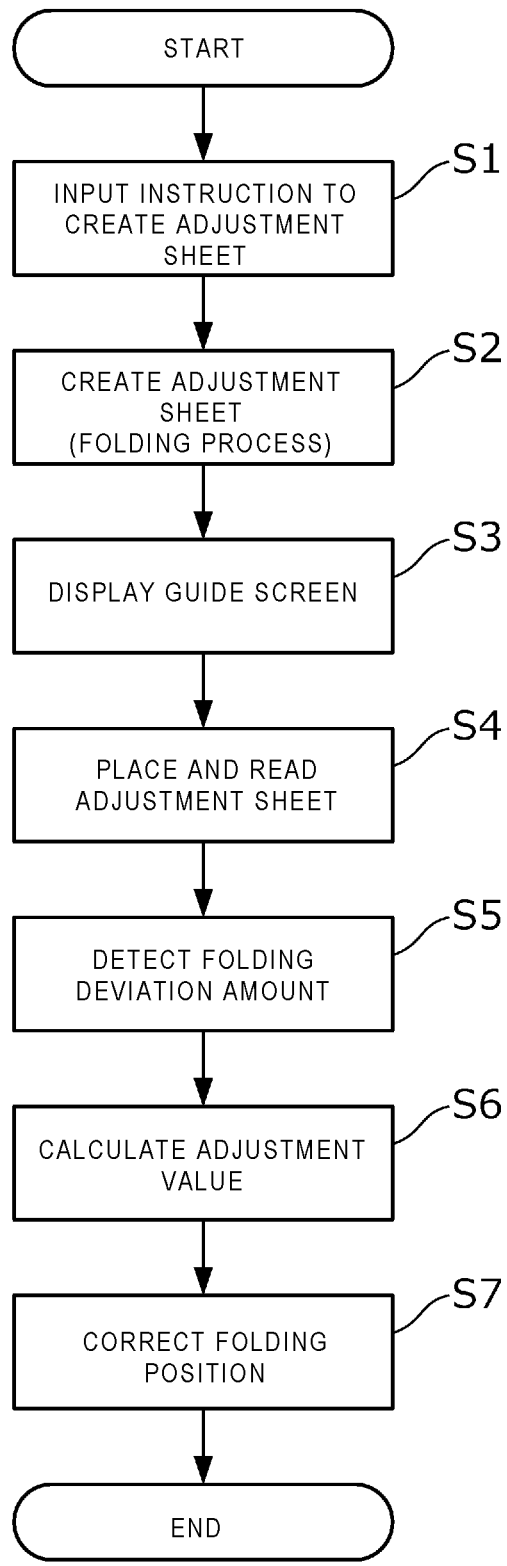
FIG. 3 is a flowchart of an example of a folding position adjustment process.

FIG. 3 is a flowchart of an example of the folding position adjustment process performed by the image forming apparatus 1. The image forming apparatus 1 is, for example, a commercial printer that prints a large amount of booklets such as brochures. When the user wants to adjust a folding deviation of a sheet, the image forming apparatus 1 prints a test print adjustment sheet, and detects a folding deviation amount using the adjustment sheet before printing a sheet used for an actual booklet. Here, the "adjustment sheet" refers to a sheet used for the folding position adjustment process. The image forming unit 104 forms, on the adjustment sheet, a pattern image that facilitates detecting of a folding line. Alternatively, the image forming unit 104 may not form any image on the adjustment sheet, or may form contents such as characters and images to be printed on the actual booklet. When the actual booklet is created by binding, for example, 5 sheets, the number of the adjustment sheet may be 1 or may be 5.

In step S1, the UI 103 receives a user's input of an instruction to create an adjustment sheet creation. This creation instruction may be input by the user from, for example, a personal computer (hereinafter referred to as "PC") connected to a network. The creation instruction includes folding manner information. Here, the "folding manner information" refers to information including an identifier of the folding manner and an identifier of a sheet.

Figure 4A:
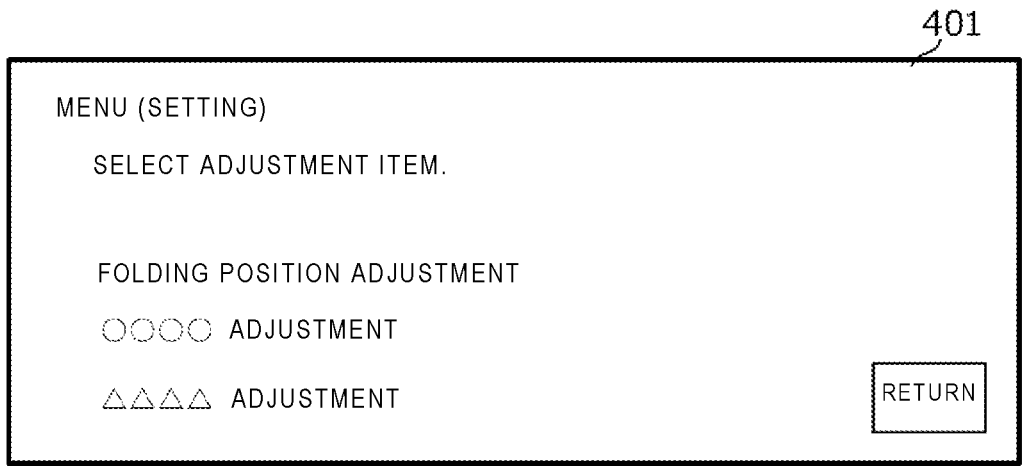
FIGS. 4A to 4C are diagrams showing examples of menu screens in the folding position adjustment process.
Figure 4B:
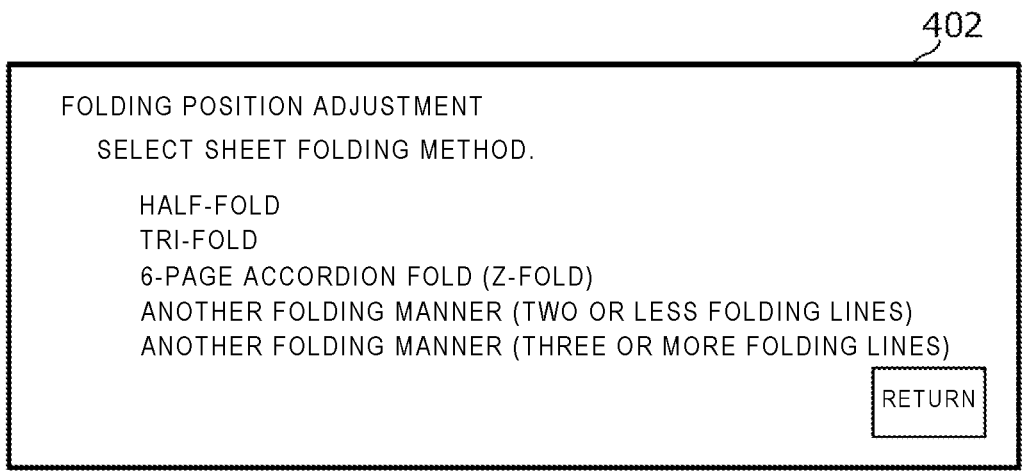
Figure 4C:
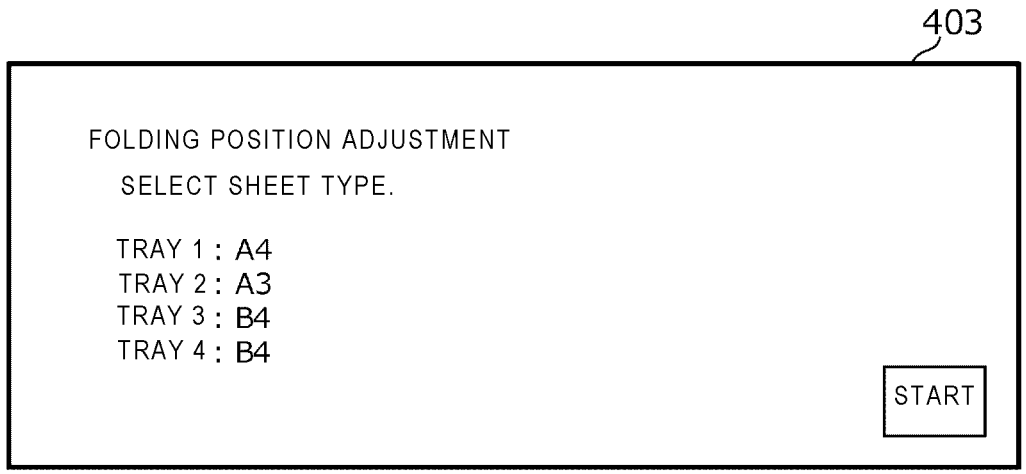

FIGS. 4A to 4C are diagrams showing examples of menu screens in the folding position adjustment process displayed on the UI 103. The UI 103 first displays a menu screen. FIG. 4A is a diagram showing an example of the menu screen. On a screen 401, for example, displayed is a list of items that the user can set in the image forming apparatus 1. The user selects a desired process, here, "folding position adjustment". The UI 103 receives the selection of the "folding position adjustment" from the user.

When the user inputs the selection of the "folding position adjustment", the UI 103 then displays a screen for the user to select a sheet folding manner. FIG. 4B is a diagram showing an example of the screen that allows the user to select the sheet folding manner. On a screen 402, displayed is a list of folding manners that are available in the folding unit 110, such as "half-fold" and "tri-fold". The UI 103 receives a selection of the folding manner from the user.

When the user inputs a selection of the "sheet folding manner", the UI 103 then displays a screen that allows the user to select a sheet type. FIG. 4C is a diagram showing an example of the screen that allows the user to select a sheet type. On a screen 403, displayed is a list of types of sheets accommodated in the trays 26, such as "tray 1: A4" and "tray 2: A3". The UI 103 receives a selection of the sheet type from the user.

When the user inputs a selection of the "sheet type", the UI 103 then receives a user's input of an instruction to create an adjustment sheet. On the screen of FIG. 4C, an UI object for instructing to create the adjustment sheet, for example, a start button is displayed. When the start button is touched by the user, the UI 103 receives the touching as the instruction to create the adjustment sheet. The controller 101 starts creating the adjustment sheet.

In step S2, the folding unit 110 folds the sheet in the selected folding manner. For example, when "half-fold" is selected, the folding unit 110 folds the sheet at a reference folding position corresponding to the half-fold. In another example, when "tri-fold" is selected, the folding unit 110 folds the sheet at a reference folding position corresponding to the tri-fold. The storage 102 stores the reference folding position for each sheet folding manner and each sheet type.

In step S3, the UI 103 displays a guide screen. Here, the "guide screen" refers to a screen that prompts the user to place the adjustment sheet on the image reader 105. FIG. 5 is a diagram showing an example of the guide screen that prompts the user to place the adjustment sheet on the platen glass. A guide screen 501 includes, for example, an instruction such as "Place the adjustment sheet on the platen glass without unfolding the adjustment sheet", and an UI object for instructing to read the adjustment sheet, for example, a start button. According to the guidance, the user takes out the adjustment sheet from the discharge tray 58 and places the adjustment sheet on the image reader 105. On the guide screen, an UI object for starting reading of the adjustment sheet, for example, the start button is displayed. When the start button is touched by the user, the UI 103 receives the touching as an instruction to read the adjustment sheet.

When the UI 103 receives the input of the reading instruction, the image reader 105 starts reading the adjustment sheet in step S4.

In step S5, the controller 101 detects the folding deviation amount. A method of detecting the folding deviation amount will be described. To detect the folding deviation amount, the controller 101 uses the image of the adjustment sheet read by the image reader 105.

Figure 6A:
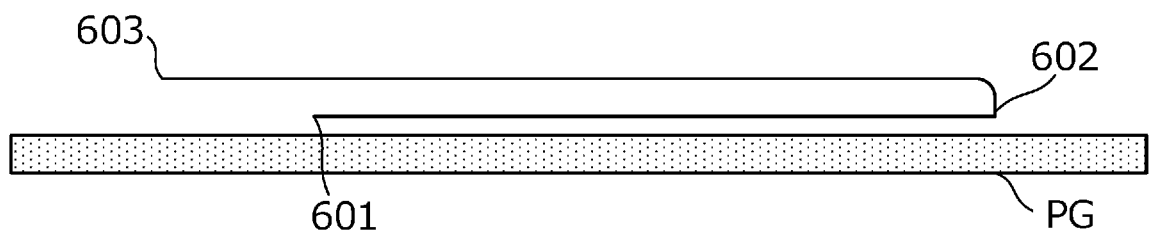
FIGS. 6A to 6C are diagrams showing an example of reading a half-folded sheet.
Figure 6B:
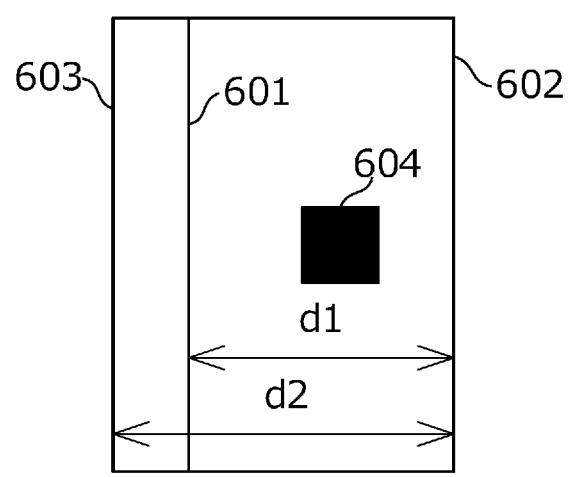
Figure 6C:
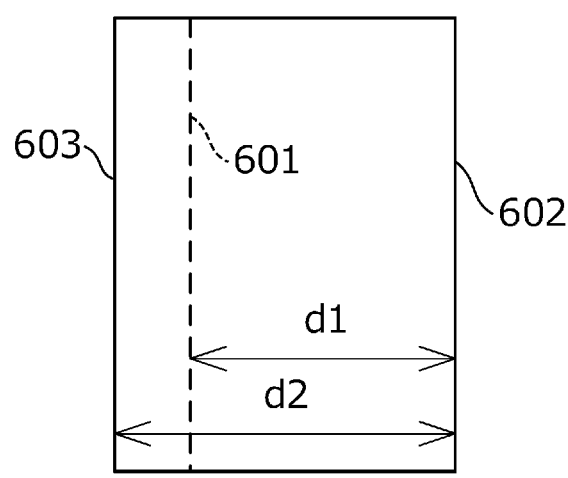

FIGS. 6A to 6C are diagrams showing an example of reading a half-folded sheet. The controller 101 detects the folding deviation amount based on sheet edges, an actual folding position, and a folding length appearing on the image. Here, the "sheet edge" refers to a side constituting an edge of the sheet. Here, among sheet edges on four sides, consider only sheet edges on two sides that are substantially parallel to the folding line. The "folding length" refers to the shortest length from a sheet edge to the reference folding position on a folded sheet.

FIG. 6A shows a cross section perpendicular to a surface of the platen glass PG when viewed from a direction of the actual folding position. Of surfaces of the folded sheet, a surface facing the platen glass PG will be referred to as a "front surface", and an opposite surface to the front surface will be referred to as a "back surface". FIG. 6B shows an image of the front surface, and FIG. 6C shows an image of the back surface.

The controller 101 analyzes the image obtained by reading the sheet and specifies a line that is inside the sheet (that is, inside an outer shape of the sheet) and extends from one end of the sheet to another end of the sheet. For example, the storage 102 stores a table in which an identifier of the folding manner, a surface to be read, and a line appearing inside the sheet are associated with one other.

FIG. 7 is a table showing a relationship among lines obtained by image analysis, a sheet edge(s), and a folding line(s). Here, the "division number" refers to the number of areas (per surface) into which a surface is divided by folding the sheet. For example, in half fold, one surface of the sheet is divided into two areas. The controller 101 specifies the sheet edges and the folding line(s) with reference to the folding manner information and the table. In most cases, it would be possible to detect a line in a region inside the outer shape of the sheet (more specifically, a line extending from one end to another end and substantially parallel to one side of the outer shape of the sheet; hereinafter referred to as a "line inside the sheet") on at least one of the front surface or the back surface. The controller 101 specifies, by referring to the table of FIG. 7, which each of (i) a side that is substantially parallel to and closer to the detected inside line among the sides constituting the outer shape of the sheet on the surface on which at least the line inside the sheet is detected and (ii) a side that is substantially parallel to and farther away from the detected inside line among the sides constituting the outer shape of the sheet on the surface on which at least the line inside the sheet is detected corresponds to a sheet edge or a folding line.

For example, as in the example of FIGS. 6A and 6B, when a sheet is half-folded, the line inside the sheet appears only on either the front surface or the back surface. According to the table, the controller 101 defines a surface on which the line inside the sheet is detected as a "first surface", and a surface opposite to the first surface as a "second surface". Whether a front surface of the read image corresponds to the first surface or the second surface and whether a back surface of the read image corresponds to the first surface or the second surface depend on an orientation of the sheet when the sheet is placed on the platen glass PG. In the example of FIG. 6B, the controller 101 specifies a side (that is, a sheet edge 603) closer to an inside line 601 (that is, one sheet edge) on the first surface as another sheet edge, and specifies a farther side (that is, a folding line 602) as a folding line.

Figure 8A:
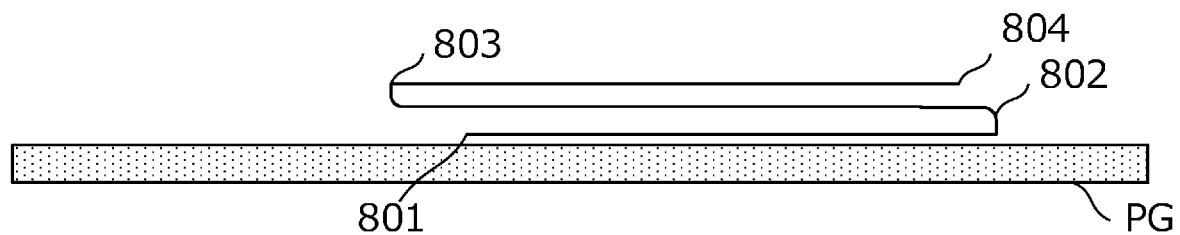
FIGS. 8A to 8C are diagrams showing an example of a folding manner that does not allow detecting of a folding deviation amount unless the sheet is unfolded.
Figure 8B:
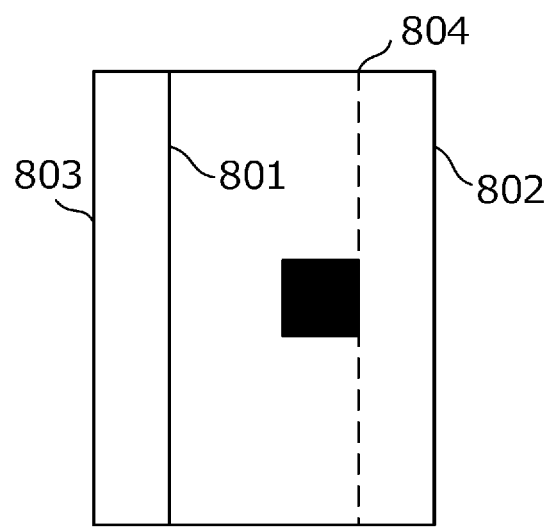
Figure 8C:
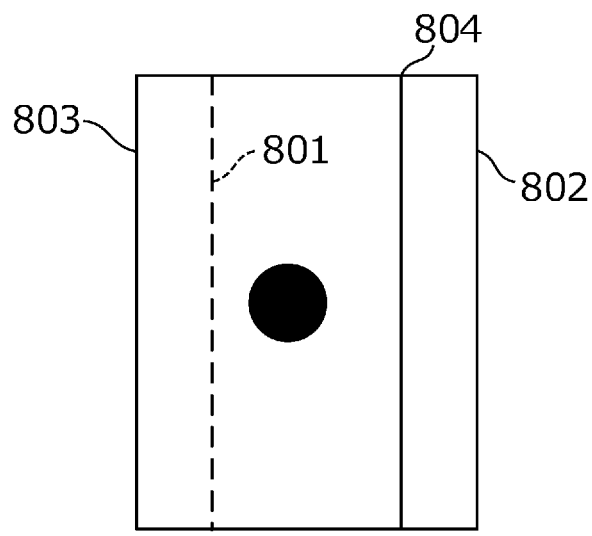
Figure 9A:
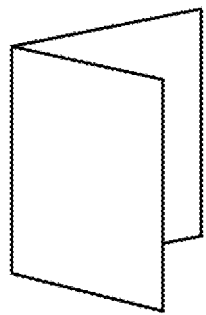
FIGS. 9A to 9F are diagrams showing examples of the sheet folding manner.
Figure 9B:
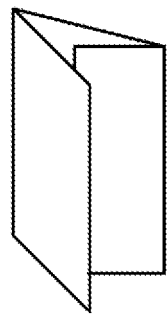
Figure 9C:
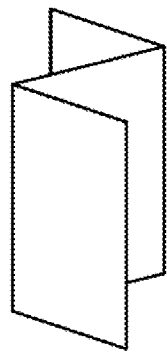
Figure 9D:
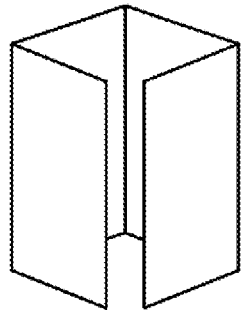
Figure 9E:
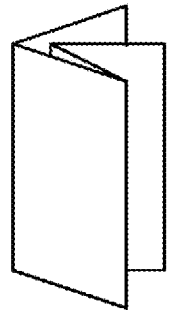
Figure 9F:
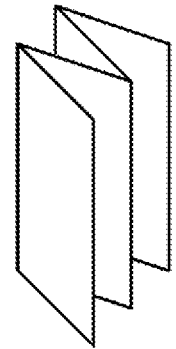

FIGS. 8A to 8C are diagrams showing an example of reading a 6-page accordion folded sheet. FIG. 8A shows a cross section perpendicular to the platen glass PG and perpendicular to the folding line of the sheet. FIG. 8B shows a read image of a front surface, and FIG. 8C shows a read image of a back surface. Since the folding manner is 6-page accordion fold, lines inside the sheet appear on both the front surface and the back surface. According to the table in FIG. 7, the controller 101 defines one surface as the second surface. The controller 101 specifies a side (that is, a folding line 803) closer to an inside line 801 (that is, one sheet edge) on the first surface as one folding line, and specifies a farther side (that is, a folding line 802) as another folding line. The other sheet edge 804 is hidden and is invisible on the first surface, but is visible on the second surface. The table of FIG. 7 is premised on that when the sheet is unfolded, lines are arranged in an order of a sheet edge 1, a folding line 1, a folding line 2, and a sheet edge 2 from the sheet edge 1.

Then, how to detect the folding deviation amount and how to adjust the folding position will be described. First, the controller 101 specifies the reference folding position. For example, when a sheet is half-folded (that is, a surface is divided into two areas), the reference folding position is a position at which the sheet is divided in half, that is, a midpoint of a side perpendicular to the folding line.

In the example of FIG. 6B, a reference folding position of the folding line 602 is a midpoint of a side perpendicular to the folding line 602 (in a state where the sheet is unfolded). That is, a distance d1 from the folding line 602 to the sheet edge 601 and a distance d2 from the folding line 602 to the sheet edge 603 are ideally equal to each other. However, distances actually measured in the example of FIG. 6B are d1<d2. A folding deviation amount $\Delta d$ is $\Delta d = d2 - d1$. The controller 101 adjusts the folding position such that the folding deviation amount decreases and ideally becomes zero.

In the example of FIG. 6B, the controller 101 may simply move the folding line 602 to approach the sheet edge 603. For example, an approaching amount, that is, an adjustment amount $\delta$, is $\delta = \Delta d / 2$.

In the example of FIG. 6C, a reference folding position of the folding line 602 is a bisecting point on a side perpendicular to the folding line 602 (in a state where the sheet in unfolded). In this case, it is necessary to know a length of the side perpendicular to the folding line 602 in a state where the sheet is unfolded. However, when one surface (that is, either the first surface or the second surface) of the half-folded sheet is read and only one sheet edge appears on the read surface (that is, when an image obtained by reading the sheet is only the image shown in FIG. 6C), one sheet edge 601 is hidden and is invisible. As a result, the distance d1 from the folding line 602 to the sheet edge 601 cannot be measured. In this case, the controller 101 specifies the length of the side of the sheet (that is, d1+d2) by using the identifier of the sheet included in the folding manner information. Specifically, the storage 102 stores information that associates the identifier of the sheet and the length of the side of the sheet with each other. The controller 101 specifies the length of the side of the sheet with reference to this information. The controller 101 adjusts the folding position so as to approach a position at which the specified length of the side is divided in half. The approaching amount, that is, the adjustment amount $\delta$ is similar to that in the example of FIG. 6B.

In the example of FIGS. 8A to 8C, a reference folding position of the folding line 802 is a trisection point on a side perpendicular to the folding line 802 (in a state where the sheet in unfolded). In this case, it is necessary to know a length of the side perpendicular to the folding line 802 in a state where the sheet is unfolded. However, when the sheet is 6-page accordion folded as in the example of FIG. 8B, one sheet edge 804 is hidden and is invisible. As a result, the length of the side perpendicular to the folding line 802 cannot be measured. In this case, the controller 101 specifies the length of the side of the sheet by using the identifier of the sheet included in the folding manner information. Specifically, the storage 102 stores the information that associates the identifier of the sheet and the length of the side of the sheet with each other. The controller 101 specifies the length of the side of the sheet with reference to this information. The controller 101 adjusts the folding position so as to approach a position at which the length of the specified side is divided into thirds. It is noted that the controller 101 cannot specify a sheet edge on the surface shown in FIG. 8B only based on an image read from a surface where only one sheet edge appears as shown in FIG. 8C. Thus, depending on the folding manner, the folding deviation amount cannot be detected only based on an image of one surface.

FIGS. 9A to 9F are diagrams showing examples of sheet folding manners. FIGS. 9A to 9F show half-fold, tri-fold (6-page gate fold), 6-page accordion fold (Z-fold), 8-page gate fold, double parallel fold, and 8-page accordion fold (W-fold), respectively.

The half-fold (see FIG. 9A), tri-fold (see FIG. 9B), and 6-page accordion fold (Z-fold) (see FIG. 9C) are examples of a folding manner that allows detecting of the folding deviation amount without unfolding the sheet. On the other hand, the 8-page gate fold (see FIG. 9D), double parallel fold (see FIG. 9E), and 8-page accordion fold (W-fold) (see FIG. 9F) are examples of the folding manner that does not allow detecting of the folding deviation amount with the sheet folded.

The present exemplary embodiment is used in the "folding manner that allows detecting of a folding deviation amount without unfolding a sheet". Here, the "folding manner that allows detecting of the folding deviation amount without unfolding the sheet" is a folding manner that allows specifying of sheet edges and a folding length at least in an image obtained by reading one surface of a folded sheet. An example of this folding manner is a folding manner in which the number of folding lines on the sheet is two or less. On the other hand, the "folding manner that does not allow detecting of the folding deviation amount cannot unless the sheet is unfolded" is a folding manner that does not allow specifying of a sheet edge nor a folding length in images obtained by reading both sides of a folded sheet (for example, sheet edges are hidden and are invisible). An example of this folding manner is a folding manner in which the number of folding lines on the sheet is three or more.

In step S6, the controller 101 calculates an adjustment value for correcting the folding deviation, based on the read image of the adjustment sheet. Here, the "adjustment value" indicates a length by which the controller 101 moves the folding position to decrease the folding deviation amount. Specifically, the controller 101 specifies the position(s) of the sheet edge(s), specifies the actual folding position(s), and measures the folding length(s), based on the read image.

The controller 101 (specifically, the detector 109) calculates the adjustment value based on the specified position(s) of the sheet edge(s), the specified actual folding position(s), and the measured folding length(s).

In the example of FIG. 6B, the adjustment value for half-fold is obtained as follows.

Folding Length=50 d1=40 (from sheet edge 601 to actual folding position (that is, folding line 602))

d2=60 (from actual folding position (that is, folding line 602) to sheet edge 603)

Folding Deviation Amount Δd=60−40=20

Adjustment Amount δ=20/2=10

In the example of FIG. 6C, the adjustment value for half-fold is obtained as follows.

Reference Folding Length=100 d2=60 (from actual folding position (that is, folding line 602) to sheet edge 603)

d1=100−60=40

Folding Deviation Amount Δd=60−40

Folding Deviation Amount Δd=20

Adjustment Amount δ=20

Refer back to FIG. 3 again. In step S7, the controller 101 adjusts the folding unit 110 based on the calculated adjustment value such that the folding deviation amount decreases, so as to adjust the folding deviation.

In the folding position adjustment process, it is unknown which direction the user places the sheet to face. Therefore, when it cannot be specified whether the read image is of the first surface or the second surface, a direction in which a folding deviation occurs cannot be discriminated (that is, a correction direction cannot be determined).

FIG. 10 is a flowchart of an example of a process of determining the correction direction in the folding position adjustment performed in step S5 when an image of only one of the first surface and the second surface is read. This process is performed, for example, when half-fold is selected. The process is performed, for example, between steps S5 and S6.

Figures 11, 12:
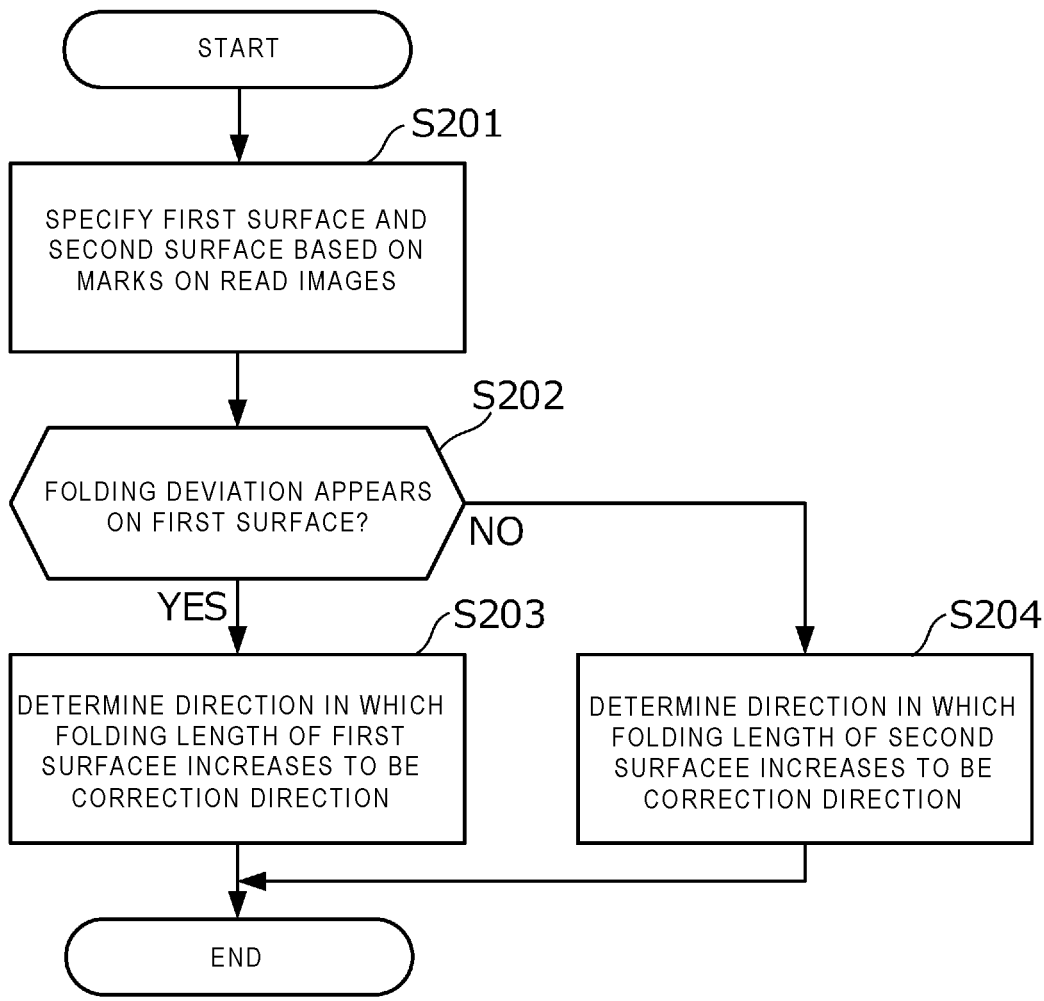
FIG. 11 is table showing a relationship among identification images obtained by the image analysis, a first surface, and a second surface.
FIG. 12 is a flowchart of an example of a process of determining a correction direction when images on the first and second surfaces of the sheet is read.

In step S101, the controller 101 (specifically, the discrimination unit 106) specifies, based on an identification image that appears on the read image, whether the read surface is the first surface or the second surface. FIG. 11 is a table showing a relationship among identification images obtained by image analysis, the first surface, and the second surface.

The controller 101 specifies, based on the identification image that appears on the image and the table, whether the read image is of the first surface or the second surface. The storage 102 stores information in which a type of the identification image is associated with the first surface or the second surface. The discrimination unit 106 reads, from the storage 102, information corresponding to the identification image appearing on the image, and determines whether the surface on which the folding deviation occurs is the first surface or the second surface.

In the example of FIGS. 6A to 6C, for example, when a first identification image 504 "■" (a square filled with black) appears on the read image, the controller 101 specifies the read image as the first surface.

In step S102, the controller 101 determines whether a folding deviation appears on the read image. When the controller 101 determines that the folding deviation appears on the read image (step S102: YES), the process proceeds to step S103.

In step S103, the controller 101 determines a direction in which a folding length of the first surface increases (that is, a direction from the folding position toward a sheet edge on the second surface) to be the correction direction.

On the other hand, if the folding deviation does not appear on the read image (step S102: NO), the process proceeds to step S104.

In step S104, the controller 101 measures an actual folding length of the read surface. The "actual folding length" refers to the shortest length from the sheet edge to the actual folding position of the sheet, which is folded by the folding unit 110, with the sheet folded.

In step S105, when a relationship between the measured actual folding length and the reference folding length meets Actual Folding Length<Reference Folding Length (step S105: YES), the process proceeds to step 103, that is, the controller 101 determines a direction in which a folding length of the first surface increases to be the correction direction (step S103).

On the other hand, in step S105, when the relationship between the measured actual folding length and the reference folding length does not meet Actual Folding Length<Reference Folding Length (that is, the relationship meets "Actual Folding Length>Reference Folding Length") (step S105: NO), the process proceeds to step S106.

In step S106, the controller 101 determines a direction in which the folding length of the first surface decreases (that is, a direction from the folding position toward a sheet edge on the first surface (in other words, a direction in which a folding length of the second surface increases)) to be the correction direction.

FIG. 12 is a flowchart of an example of a process of determining the correction direction in the folding position adjustment performed in step S5 when images on both the first and second surfaces are read. This process is performed when selected is a folding manner (such as tri-fold and 6-page accordion fold) in which the number of folding lines is two or more. The process is performed, for example, between steps S5 and S6.

In step S201, the controller 101 (specifically, the discrimination unit 106) specifies, based on identification images that appear on the read images, whether each read surface is the first surface or the second surface. FIG. 11 is a table showing a relationship among identification images obtained by image analysis, the first surface, and the second surface.

The controller 101 specifies, based on the identification image that appears on the image and the table, whether the read image is of the first surface or the second surface. The storage 102 stores information in which a type of the identification image is associated with the first surface or the second surface. The discrimination unit 106 reads, from the storage 102, information corresponding to the identification image appearing on the image, and determines whether the surface on which the folding deviation occurs is the first surface or the second surface.

An example in which images shown in FIGS. 6B and 6C are read will be described below. Since a mark "■" (a square filled with black) appears on one surface as shown in FIG. 6B, the controller 101 identifies this surface as the first surface. The controller 101 also specifies the other surface having the image shown in FIG. 6C, as the second surface.

Similarly, an example in which images shown in FIGS. 8B and 8C are read will be described below. Since the mark "■" appears on one surface as shown in FIG. 8B, the controller 101 specifies this surface as the first surface. Also, since a mark "•" (a circle filled with black) appears on the other surface as shown in FIG. 8C, the controller 101 specifies this surface as the second surface. When a sheet is 6-page accordion folded, folding deviations may occur on both the first and second surfaces of the sheet. However, based on the identification images formed on both surfaces, the controller 101 can specify whether each folding deviation occurs on the first surface or the second surface.

Refer back to FIG. 12 again. In step S202, the controller 101 determines whether the folding deviation appears on the specified first surface. When determining that the folding deviation appears on the read image (step S202: YES), the controller 101 causes the process to process to step S203.

In step S203, the controller 101 determines a direction in which a folding length of the first surface increases (that is, a direction from the folding position toward the sheet edge on the second surface) to be the correction direction.

On the other hand, when determining that no folding deviation appear on the specified first surface (step S202: NO), the controller 101 causes the process to process to step S204.

In step S204, the controller 101 determines a direction in which a folding length of the second surface increases (that is, a direction from the folding position toward the sheet edge on the first surface) to be the correction direction.

Figure 13A:
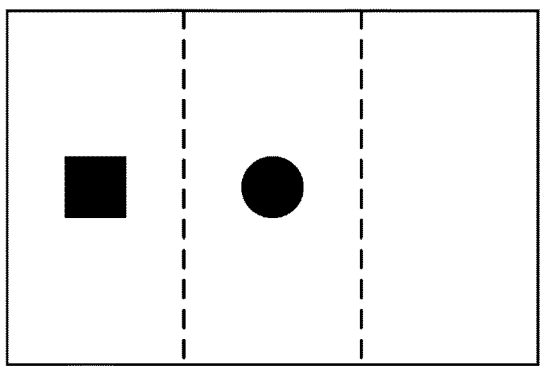
FIGS. 13A and 13B are diagrams showing an example of a state in which a tri-folded sheet on which identification images are formed is unfolded.
Figure 13B:
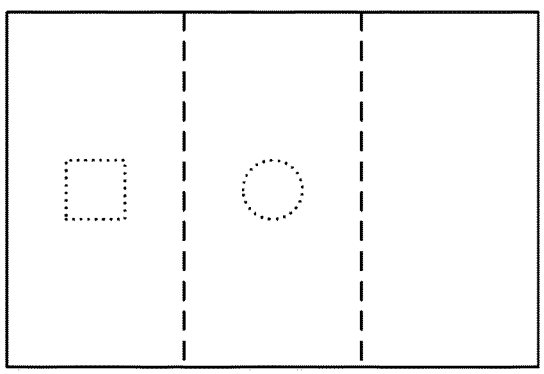

FIGS. 13A and 13B are diagrams showing an example of a state in which a tri-folded sheet on which identification images are formed is unfolded. FIG. 13A is a diagram showing an example of one surface of the tri-folded sheet in the unfolded state. FIG. 13B is a diagram showing an example of the other surface of the tri-folded sheet in the unfolded state. When the number of folding lines is two, the sheet is divided into three areas. When the sheet is tri-folded, surfaces which are outer surfaces of the folded sheet are (i) a surface of one of two parts located on both sides of the sheet that is divided into three parts, and (ii) a surface of the middle part. The image forming unit 104 forms different identification images (for example, "■" and "•") on portions of the sheet that become such surfaces, respectively. When the sheet is tri-folded, plural identification images are formed on surfaces that become the same surface (that is, one side) of the sheet in the unfolded state.

Figure 14A:
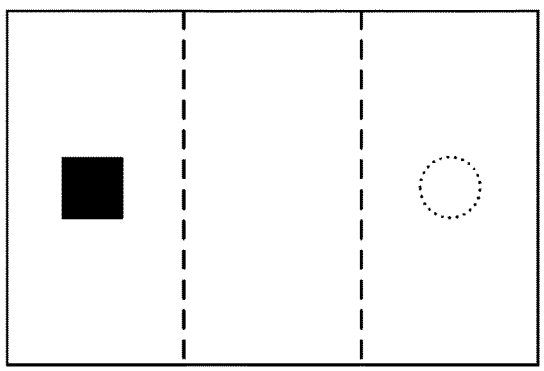
FIGS. 14A and 14B are diagrams showing examples of front and back surfaces of a 6-page accordion folded sheet on which identification images are formed.
Figure 14B:
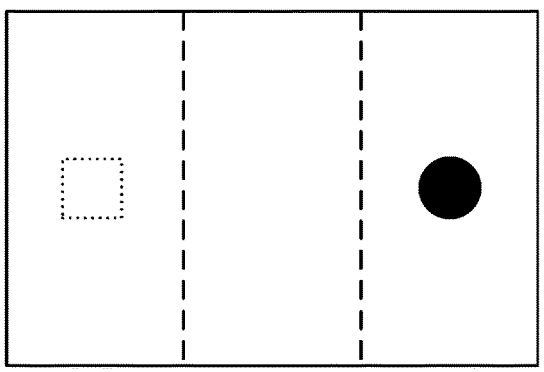

FIGS. 14A and 14B are diagrams showing examples of front and back surfaces of a 6-page accordion folded sheet on which identification images are formed. FIG. 14A is a diagram showing an example of the front surface (that is, one surface) of the 6-page accordion folded sheet. FIG. 14B is a diagram showing an example of the back surface (that is, the other surface) of the 6-page accordion folded sheet. When a sheet is 6-page accordion folded, surfaces which are outer surfaces of the folded sheet are two surfaces of two parts located on both sides of the sheet that is divided into three parts. The image forming unit 104 forms different identification images (for example, "■" and "•") on portions of the sheet that correspond to such surfaces, respectively. When the sheet is 6-page accordion folded, identification images are formed on both surfaces of the sheet in an unfolded state.

3. Modifications

The present disclosure is not limited to the exemplary embodiments described above. Various modifications may be made. Hereinafter, a couple of modifications will be described. Two or more items described in the following modifications may be used in combination.

3-1. Identification Image

Figure 15A:
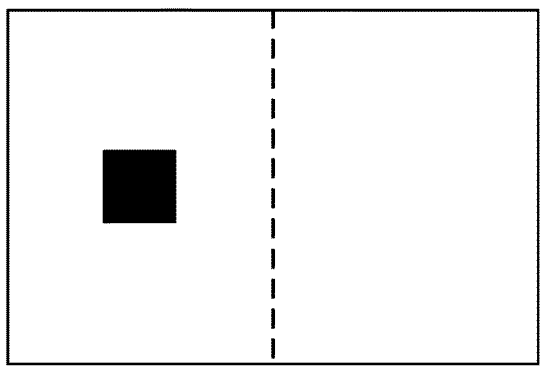
FIGS. 15A to 15F are diagrams showing examples of the identification image formed on the sheet.
Figure 15B:
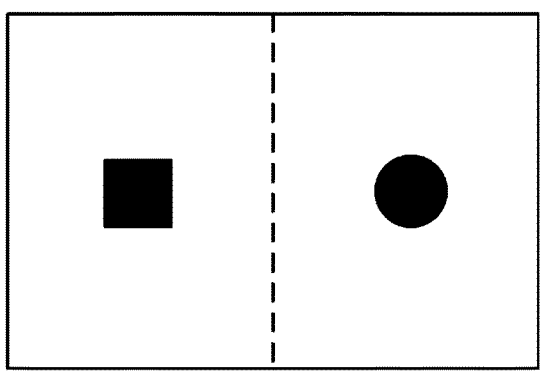
Figure 15C:
Figure 15D:
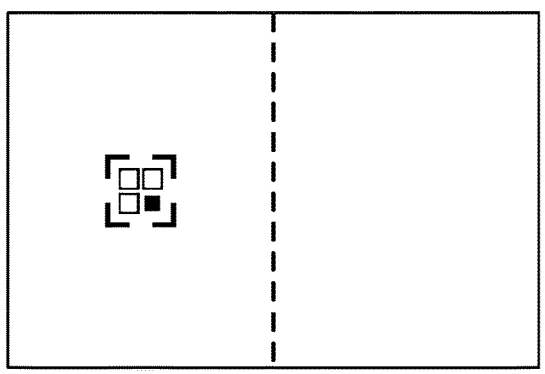
Figure 15E:
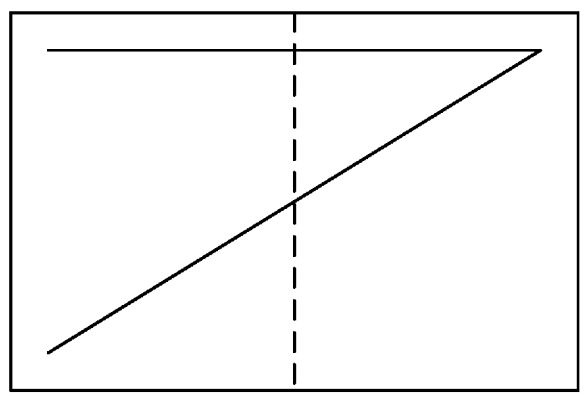
Figure 15F:

The image forming unit 104 may form other identification images on the sheet instead of forming the identification images such as "■" and "•" on the sheet. FIGS. 15A to 15F are diagrams showing examples of identification images formed on the sheet. FIG. 15A is a diagram showing an example of a sheet on which an identification image "■" is formed on the first surface. FIG. 15B is a diagram showing an example of a sheet on which an identification image "■" is formed on the first surface and an identification image "•" is formed on the second surface. FIG. 15C is a diagram showing an example of a sheet on which an identification image "←" (leftward arrow) is formed on the first surface and an identification image "→" (rightward arrow) is formed on the second surface. Tips of the arrows indicate directions in which the sheet edges are located. FIG. 15D is a diagram showing an example of a sheet on which an identification image that is "QR code (registered trademark)" is formed on the first surface. The QR code is an example of an image showing the folding manner information. FIG. 15E is a diagram showing an example of a sheet on which an identification image "two line segments" is formed. The two line segments are formed, for example, so to straddle the folding line. The two line segments have different slopes such that while the two line segments do not intersect with each other on the first surface, the two line segments intersect with each other on the second surface. FIG. 15F is a diagram showing an example of a sheet on which identification images that are "punch holes" are formed on the first surface.

3-2. Automatic Sheet Reading

When a folding manner that allows detecting of the folding position with the sheet folded, the image forming apparatus 1 may automatically transport the sheet to the image reader 105 instead of having the user place the sheet. In this case, the UI 103 may not display a guide screen.

3-3. Hardware Configuration

The hardware configuration of the image forming apparatus 1 is merely an example. Any hardware configuration may be used. For example, the image forming apparatus 1 and the folding device (that is, the folding unit 110) may be different devices.

3-4. Others

The program to be executed by the controller 101 may be provided in a form of a recording medium such as an optical disc that stores the program. Alternatively, the program to be executed by the controller 101 may be downloaded to a computer via a communication line such as the Internet, installed in the computer and made available.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiments were chosen and described in order to best explain the principles of the disclosure and its practical apps, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor that is configured to:
    read an image of at least one of a first surface or a second surface of a medium with the medium folded;
    discriminate whether the image is of the first surface or the second surface based on an identification image in the image;
    specify, based on the image, a surface on which a folding deviation occurs; and
    automatically determine a correction direction of the folding deviation according to whether the surface on which the folding deviation occurs is the first surface or the second surface and adjust a folding mechanism based on the automatically determined correction direction so that the folding deviation decreases.

2. The information processing apparatus according to claim 1, wherein
the medium is a half-folded medium,
one surface of the first surface or the second surface of the half-folded medium is read, and
the correction direction is determined according to (i) the identification image on the one surface and (ii) the folding deviation.

3. The information processing apparatus according to claim 2, wherein when the one surface is the surface on which the folding deviation occurs, a direction opposite to a sheet edge side on the one surface is determined to be the correction direction.

4. The information processing apparatus according to claim 3, wherein a correction amount is detected by measuring a folding length of the medium in a direction intersecting the folding deviation.

5. The information processing apparatus according to claim 3, wherein a correction amount is detected based on the folding deviation.

6. The information processing apparatus according to claim 2, wherein when the one surface is not the surface on which the folding deviation occurs, a direction toward a sheet edge side on the one surface is determined to be the correction direction.

7. The information processing apparatus according to claim 6, wherein a correction amount is detected by measuring a folding length of the medium in a direction intersecting the folding deviation.

8. The information processing apparatus according to claim 6, wherein a correction amount is detected based on the folding deviation.

9. The information processing apparatus according to claim 2, wherein a correction amount is detected by measuring a folding length of the medium in a direction intersecting the folding deviation.

10. The information processing apparatus according to claim 2, wherein a correction amount is detected based on the folding deviation.

11. The information processing apparatus according to claim 1, wherein a correction amount is detected by measuring a folding length of the medium in a direction intersecting the folding deviation.

12. The information processing apparatus according to claim 1, wherein
the medium is a half-folded medium,
both surfaces of the first surface and the second surface of the half-folded medium are read, and
the correction direction is determined according to (i) the identification image on the one of the first and second surfaces and (ii) the folding deviation.

13. The information processing apparatus according to claim 1, wherein
the medium is a tri-folded medium,
a first identification image is formed on the first surface of the medium,
a second identification image is formed on the second surface,
both surfaces of the first surface and the second surface of the tri-folded medium are read, and
the correction direction is determined according to the first identification image, the second identification image, and the folding deviation.

14. The information processing apparatus according to claim 13, wherein when the folding deviation is larger than a target folding deviation, a direction toward a sheet edge side is determined to be the correction direction.

15. The information processing apparatus according to claim 13, wherein when the folding deviation is smaller than a target folding deviation, an opposite direction to a direction toward a sheet edge side is determined to be the correction direction.

16. The information processing apparatus according to claim 1, wherein a correction amount is detected based on the folding deviation.

17. A non-transitory computer readable medium storing a program that causes a computer including a processor to execute information processing, the information processing comprising:

reading an image of at least one of a first surface or a second surface of a medium with the medium folded, discriminating whether the image is of the first surface or the second surface based on an identification image in the image;

specifying, based on the image, a surface on which a folding deviation occurs; and automatically determining a correction direction of the folding deviation according to whether the surface on which the folding deviation occurs is the first surface or the second surface and adjusting a folding mechanism based on the automatically determined correction direction so that the folding deviation decreases.

* * * * *